United States Patent [19]
Binks

[11] 3,816,703
[45] June 11, 1974

[54] CHICKEN COOKING APPARATUS
[75] Inventor: Chester Binks, La Grange, Ill.
[73] Assignee: Restaurant Technology, Inc., Oak Brook, Ill.
[22] Filed: Aug. 30, 1973
[21] Appl. No.: 392,941

Related U.S. Application Data
[62] Division of Ser. No. 120,641, March 3, 1971, abandoned.

[52] U.S. Cl................. 219/440, 99/330, 99/333, 99/403, 126/381, 219/431, 426/438
[51] Int. Cl............................................. F27d 11/02
[58] Field of Search ........... 219/401, 415, 431, 440; 99/107, 330, 332, 403, 333; 426/438; 126/369, 381

[56] References Cited
UNITED STATES PATENTS

| | | | |
|---|---|---|---|
| 2,194,118 | 3/1940 | Graham | 219/440 |
| 2,778,736 | 1/1957 | Wagner | 426/438 |
| 2,812,414 | 11/1957 | Wecks | 219/431 |
| 2,914,063 | 11/1959 | Wagner | 126/381 |
| 3,194,662 | 7/1965 | Nelson | 99/330 X |
| 3,280,722 | 10/1966 | Rahauser | 99/332 |
| 3,610,133 | 10/1971 | Mies et al. | 99/330 |

*Primary Examiner*—Volodymyr Y. Mayewsky
*Attorney, Agent, or Firm*—Dressler, Goldsmith, Clement & Gordon

[57] ABSTRACT

An automatic fryer for chicken is disclosed. Chicken is placed in a vessel containing heated cooking oil and is sealed therein. A control circuit maintains a first temperature and atmospheric pressure for a first time period and, after the conclusion of the first time period, automatically maintains the oil above a lower temperature level and desirably pressurizes the vessel. After a second time period, the control circuit automatically vents the vessel, signals, and resets. Automatic control is provided alternately for full or partial loads, to prevent overcooking of partial loads, and to assure the proper cooking of full loads.

5 Claims, 3 Drawing Figures

INVENTOR
Chester Binks
by Dressler Goldsmith
Clement E Gordon Atty's

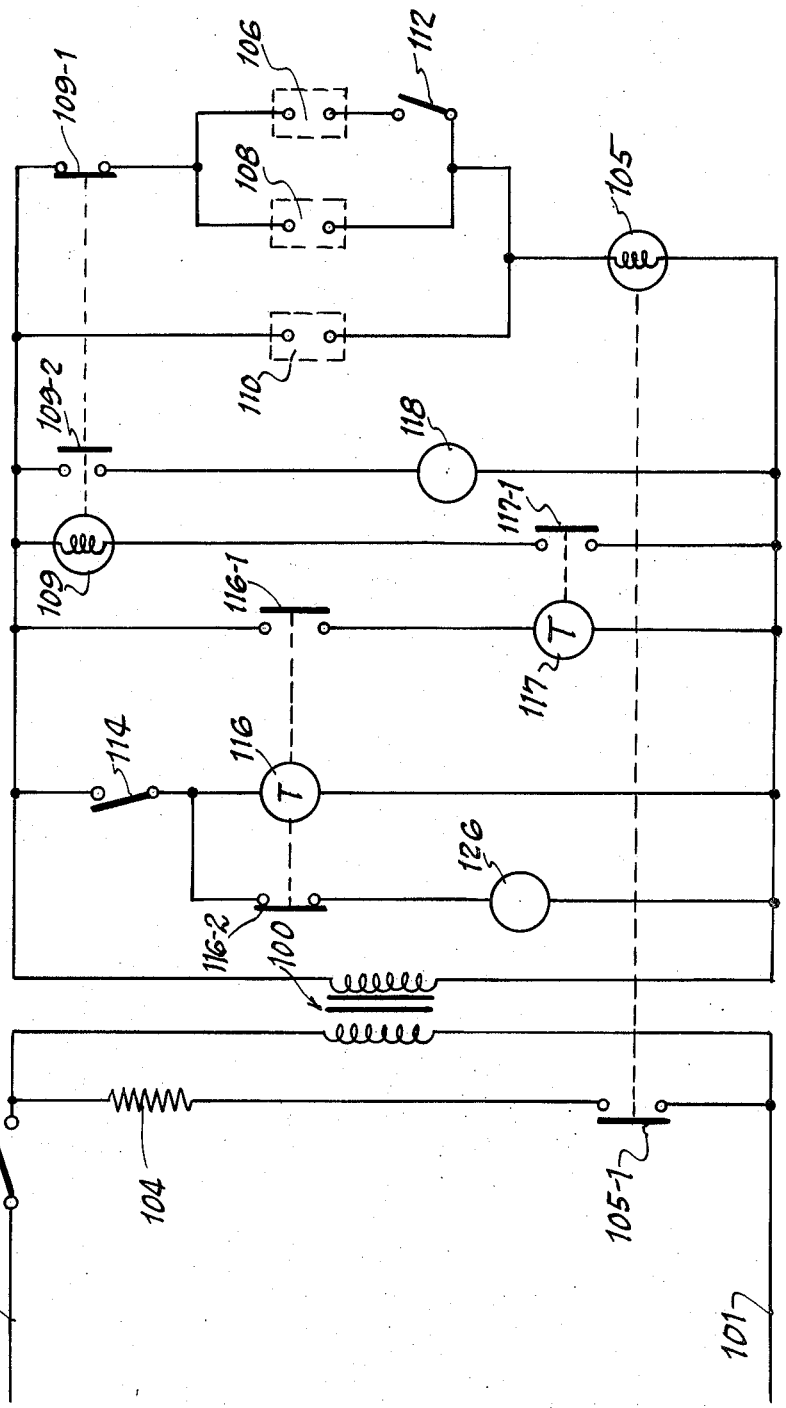

CHICKEN COOKING APPARATUS

This application is a division of application Ser. No. 120,641, filed Mar. 3, 1971 now abandoned.

This invention relates to an improved and simplified method for cooking chicken, and most especially to a method of frying pre-breaded, frozen raw chicken. This invention further relates to improved cooking equipment adapted to carry out the method of this invention.

The sale of fried chicken and chicken parts, such as for carry-out, is rapidly increasing in volume. Various processes are used to produce such chicken, but by any process the best fried chicken is that which has been prepared for sale directly from fresh chicken, as distinguished from frozen chicken.

Of course, there are known advantages to the use of frozen raw or frozen pre-fried chicken, but such pretreated chicken has not previously produced high-quality fried chicken, at least from processes that produce the fried chicken rapidly, a further requirement for high-volume, carry-out restaurants.

The method and apparatus of this invention produce high-quality fried chicken directly from pre-breaded, frozen, raw chicken, and at a speed generally consistent with the needs of the carry-out trade, i.e., at a speed generally comparable to the processes used today for preparing fried chicken directly from fresh chicken. Furthermore, the apparatus and method of this invention is fully automatic, insuring uniform quality from batch to batch. Additionally, means for accommodating full loads and partial loads, alternately, and automatically, and without requiring an operator to monitor the cooking process, are provided in accordance with this invention.

A fryer in which the method of this invention may be carried out comprises a sealable pressure vessel in which a cooking liquid, such as cooking oil, may be heated to elevated temperatures, and a vent for venting the vessel. The oil is maintained between cooking cycles, i.e., under idling conditions, at a first selected temperature level.

The automatic cooking cycle is controlled by timing means which is energized at the start of the cooking cycle by a manual starter switch. The timing means operates electric control circuitry to control the temperature of the cooking oil and to control the pressure within the pressure vessel during the cooking cycle.

In the initial portion of the cooking cycle, the cooking oil is maintained at the first selected temperature and the pressure within the vessel is maintained at atmospheric pressure. At the conclusion of the first portion of the cooking cycle when a pressurized system is used the vessel is pressurized to a selected pressure above atmospheric pressure and the temperature of the cooking oil is allowed to drop to a selected second elevated temperature substantially lower than said first selected temperature. Upon conclusion of the cooking cycle, the cooking vessel is vented to atmospheric pressure, a signal-producing device such as a buzzer is energized; the control circuitry is reset for the next cooking cycle, and the chicken is removed from the vessel.

Further objects, features and advantages of this invention will become apparent from the following description and drawings, of which:

FIG. 3 is a schematic circuit diagram of the control circuitry for the fryer of FIGS. 1 and 2.

Figures 1, 2:
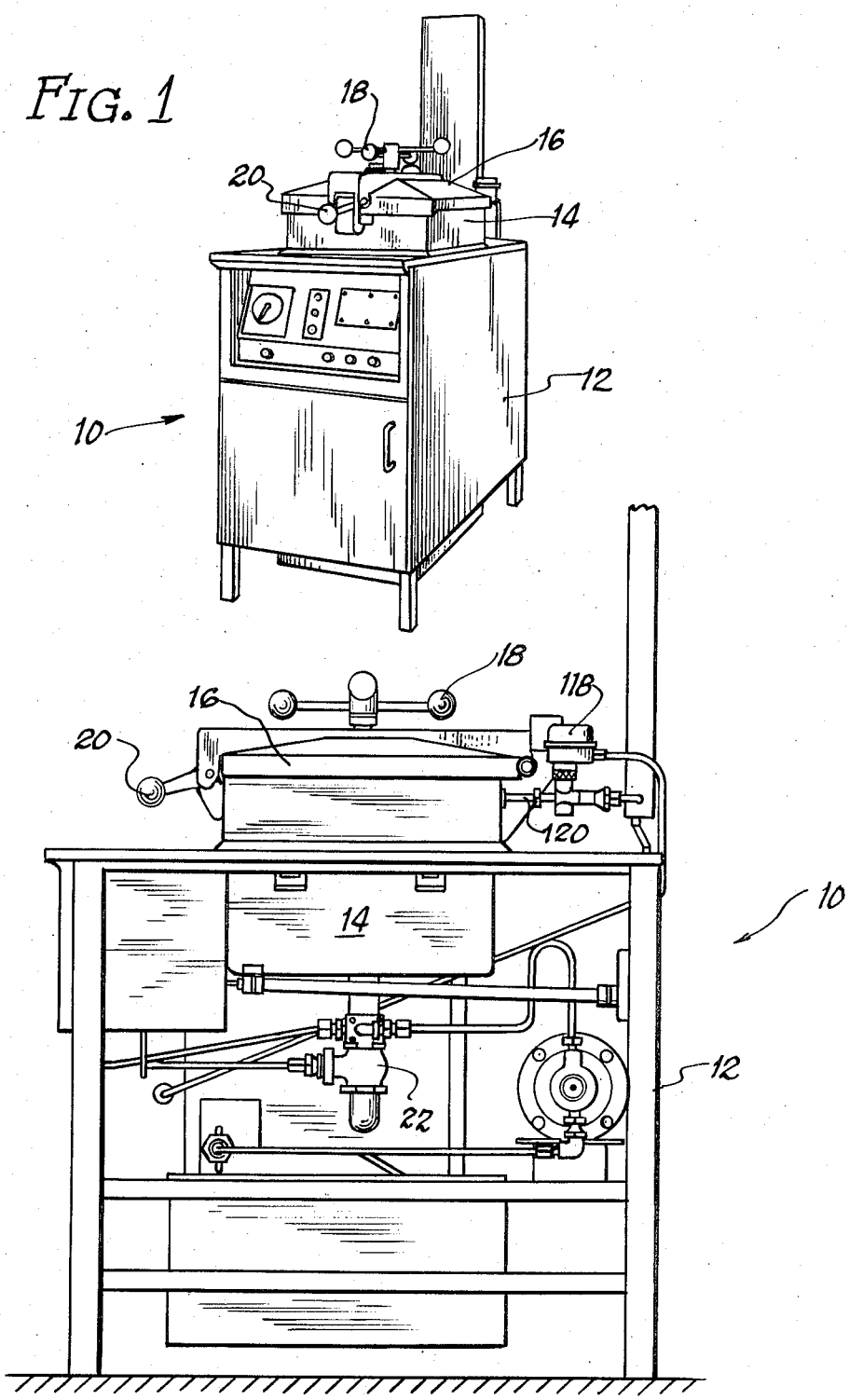
FIG. 1 is a front perspective view of a fryer of this invention.
FIG. 2 is a side view of a portion of FIG. 1.

Referring now to FIGS. 1 and 2, the fryer 10 may be generally similar to that described and illustrated in U.S. Pat. No. 2,914,063 to Chester Wagner, and may be gas or electrically heated. Desirably it is a pressure vessel. Fryer 10 comprises a cabinet 12, a frying vessel 14, and a hinged cover and lid assembly 16. Cover and lid assembly 16 includes a wheel 18 for securely sealing the cover against the top of the vessel 14, and a latch and knob mechanism 20 for positively holding the cover securely in place. Cover and lid assembly 16, wheel 18, and latch and knob mechanism 20 operate substantially in the manner in which corresponding elements described in said U.S. Pat. No. 2,914,063 operate. Fryer 10 further includes a drain and suitable filtering and pump means 22 for removal, cleaning and recycling of the cooking oil contained in vessel 14, all generally in accordance with said patent and with known practices.

As stated, the frying apparatus and method of this invention are fully automatic and are adapted to produce tasty chicken uniformly and consistently fried from batch to batch, from frozen raw chicken, whether fried in full size or partial loads. Those advantages result from the timing and control means to be described.

Referring now to FIG. 3, there is shown a schematic diagram of electric circuitry in accordance with the present invention. For illustrative purposes, the control circuitry is shown in conjunction with an electric heater element, although it should be understood that the circuitry is suitable for use with an electrically controlled gas heater.

Power for the control circuitry is provided by the secondary of a step down transformer 100, the primary of which is connected to the main power lines 101 through an on-off switch 102. An electric heater 104 is connected across the primary of the transformer 100 in series with the normally open contacts 105-1 of a heater control relay 105. The heater control relay 105 is controlled thermostatically by a series of thermostatically controlled switches 106, 108 and 110, probe portions of which are in direct contact with the oil in the vessel 14. It should be understood that for an electrically controlled gas heater, the electric heater 104 and control relay 105 would be replaced by an electrically controlled gas valve and suitable electrical control element, such as a solenoid.

Thermostatic switches 106, 108 maintain the temperature of the cooking oil at a predetermined temperature level, such as, for example, at 360°F or at 325°F, respectively, when operatively connected in the control circuit. Thermostatic switch 106 is connected in series with a selector switch 112 and switches 106 and 112 are connected in parallel with thermostatic switch 108. The parallel combination of thermostatic switch 106, selector switch 112 and thermostatic switch 108 are connected in series with the normally closed contacts 109-1 of a control relay 109 and with the heater control relay 105. Thermostatic switch 110 is connected in parallel with relay contacts 109-1, thermostatic switches 106, 108 and selector switch 112, and is connected in series with the heater control relay 105, thereby to control the heat source.

The thermostatic switches 106, 108 and 110 are closed as long as the temperature of the cooking oil is lower than the temperature for which the particular thermostatic switch is set. Thus, thermostatic switch 106 remains closed as long as the temperature of the cooking oil is below 360°F, and is open when the temperature of the cooking oil increases above 360°F. Similarly, thermostatic switch 108 remains closed as long as the temperature of the cooking oil is below 325°F and thermostatic switch 110 remains closed as long as the temperature of the cooking oil is lower than the temperature at which it is set, for example, 240°F. Thus, the temperature of the cooking oil is controlled by that thermostatic switch operatively connected in the circuit which is set for the highest temperature since that switch will complete a circuit for the heater as long as the temperature of the cooking oil is below the temperature at which the particular thermostatic switch opens.

Selector switch 112, when closed, operatively connects thermostatic switch 106 into the circuit as long as the relay contacts 109–1 are closed to maintain the temperature of the cooking oil at 360°F. If the selector switch 112 is opened, the temperature of the cooking oil is controlled by the thermostatic switch 108 and maintained at 325°F as long as relay contacts 109–1 are closed. When relay contacts 109–1 are opened, the heater is controlled by thermostatic switch 110 to maintain the final frying temperature of the cooking oil at 240°F or above.

Operation of selector switch 112 selects either of thermostatic switches 106 or 108 to control the temperature during the first portion of the automatic cooking cycle. Thermostatic switch 106 is selected for a full load, and thermostatic switch 108 is used for a partial load of chicken. A partial load is approximately one-half or less of a full load. For purposes of example, a full load may be five cut-up chickens. By selectively varying the initial temperature for the first portion of the automatic cooking cycle, as a function of full and partial loads, uniform cooking can be achieved without over cooking or burning partial loads, and without undercooking full loads.

The automatic cooking cycle is initiated by first immersing a load of pre-breaded, frozen raw chicken in the heated oil in vessel 14. The oil has been heated to and idles at the temperature selected by selector switch 112. Thereafter, the cover and lid assembly 16 is closed to seal the vessel, and immediately thereafter a manual start switch 114 for initiating a timed cycle is actuated.

Closing switch 114 energizes a first timer 116 which operates for some selected time interval to define the cooking cycle, such as about 18 minutes for raw frozen prebreaded chicken. When the first timer 116 is energized, it operates to close its normally open contacts 116–1 connected in series with a second timer, delay timer 117. The delay timer 117, after a selected initial delay, such as about 4 minutes, operates to close its normally open contacts 117–1 which are connected in series with a control relay 109. The timers 116 and 117 sequentially control the temperature of the cooking oil, by sequentially placing heater 104 under the control of thermostatic switches 106 (or 108), and 110. The timers also operate to control the pressure in vessel 14.

During the initial portion of the timed cooking cycle, after closure of switch 114, and timer contacts 116–1, but before closure of delay timer contacts 117–1, the heater control relay 105 is under the control of thermostatic switch 106 or thermostatic switch 108, whichever was selected by the selector switch 112. At the same time, the solenoid valve 118 maintains the covered vessel in communication with the atmosphere. The solenoid valve 118 desirably is in direct communication with the vessel 14, as through conduit 120 (see FIG. 2).

At the conclusion of the first portion of the timed cycle, as for example, after 4 minutes, the delay timer 117 closes its contacts 117–1 to energize control relay 109. Energized relay 109 closes its normally open contacts 109–2 to energize the solenoid valve 118, thereby closing the vessel 14 to atmosphere. Energized relay 109 also opens its normally closed contacts 109–1, in series with thermostatic switches 106, 108, automatically placing the heater control relay 105 under the control of thermostatic switch 110. Timer 116 continues to operate for a second predetermined time period, as for example, 14 minutes, during which period the pressure in the vessel is controlled by solenoid valve 118 and the temperature is under the control of thermostatic switch 110.

The solenoid valve 118 is desirably set to maintain a predetermined elevated pressure, normally generated from the moisture in the chicken, for example, 12 pounds per square inch gauge. During the second portion of the timed cycle, if the pressure rises to exceed that predetermined pressure, the solenoid valve 118 opens automatically and remains open until the vessel vents to the preset pressure, after which it closes again.

At the conclusion of the timed cycle for which timer 116 was programmed, the timer 116 opens its contacts 116–1 to deenergize timer 117, thereby opening contacts 117–1 and deenergizing relay 109. As a result, relay contacts 109–2 open to de-energize solenoid valve 118 and vent the vessel 14. Simultaneously, relay contacts 109–1 close placing the heater control relay 105, hence the oil in the vessel, under the control once again of the preselected thermostatic switch 106 or 108.

Simultaneously, timer 116 closes its normally open contacts 116–2 connected in series with start switch 114 and a buzzer or other signal device 126 to provide a signal that the cooking cycle is completed. The buzzer 126 is turned off by opening start switch 114, which also resets the timer 116.

As such, whether an operator responds immediately to the signal, as from buzzer 126, to open the vessel and remove the chicken, the pressure is relieved and excessive pressure cooking is prevented automatically. Of course, the chicken should be removed promptly to prevent overcooking and saturation of the chicken with the cooking oil.

It is intended that this invention shall not be limited to the specific embodiments illustrated and described since the foregoing description and drawings will suggest to those skilled in the art further modifications which are within the spirit and purview of this invention.

I claim:

1. Apparatus for automatically and uniformly deep-fat frying successive batches of chicken comprising: a pressure vessel adapted to contain cooking liquid and having a cover assembly for sealingly closing said vessel, an electric heater for heating said liquid in said vessel to elevated temperatures, vent means operable automatically to selectively open and close said closed vessel to the atmosphere, temperature sensitive means for controlling said heater as a function of the temperature of said liquid to maintain said liquid at selected elevated temperatures, timing means for automatically initiating timed operation of said vent means and said temperature sensitive means, said temperature sensitive means controlling said heater to maintain said liquid at a first selected elevated temperature in response to operation of said timing means during a first time interval and controlling said heater to maintain said liquid above a second elevated temperature lower than said first elevated temperature in response to operation of said timing means during a second time interval, said vent means operable to open said closed vessel to the atmosphere in response to the operation of said timing means during said first time interval and operable to close said vessel to the atmosphere in response to operation of said timing means during said second time interval.

2. Apparatus for automatically and uniformly deep-fat frying successive batches of chicken in accordance with claim 1, wherein said vent means is operable to open said vessel to the atmosphere in response to operation of said timing means subsequent to said second time interval.

3. Apparatus for automatically and uniformly deep-fat frying successive batches of chicken in accordance with claim 1, wherein said temperature sensitive means includes first temperature responsive switch means operable to control said heater to maintain said liquid at said first elevated temperature and second temperature responsive switch means operable to maintain said liquid above said second elevated temperature, said apparatus including control switch means for sequentially selecting said first and second temperature responsive switch means to control said heater in response to operation of said timing means.

4. Apparatus for automatically and uniformly deep-fat frying successive batches of chicken in accordance with claim 3, including additional first temperature responsive switch means operable to control said heater to maintain said liquid at an alternative first selected elevated temperature, and additional switch means for alternatively selecting one of said first temperature responsive switch means to control said heater.

5. Apparatus for automatically and uniformly deep-fat frying successive batches of chicken comprising a pressure vessel adapted to contain cooking liquid and having a cover assembly for sealingly closing said vessel, an electrically controlled heater for heating said liquid in said vessel to elevated temperatures, vent means operable to selectively connect said closed vessel to the atmosphere, an electrically controlled solenoid valve for operating said vent means, and an electric control circuit, said control circuit including a plurality of normally closed temperature responsive switch means connected in parallel with each other, and in series with said electrically controlled heater, each of said temperature responsive switch means opening in response to the temperature of said liquid in said vessel reaching a selected elevated temperature, a first of said temperature responsive switch means opening at a first elevated temperature, a second of said temperature responsive switch means opening at a second elevated temperature lower than said first temperature and a third of said temperature responsive switch means opening at a third temperature lower than said second temperature, selector switch means connected in series with said first temperature responsive switch means, first normally closed control switch means connected in series with said first and second temperature responsive switch means, whereby said heater is controlled by said first temperature responsive switch means when said selector switch means is closed to maintain said liquid at said first elevated temperature, and said heater is alternatively controlled by said second temperature responsive switch means when said selector switch means is open to maintain said liquid at said second elevated temperature, second normally open control switch means connected in series with said solenoid valve, timer means for controlling the operation of said control switches to define a cooking cycle, a start switch for initiating operation of said timer means and control means responsive to the operation of said timer means for maintaining said first control switch means normally closed and said second control switch means normally open during a first portion of said cooking cycle, for opening said normally closed control switch to effect control of said heater by said third temperature responsive switch means to maintain said liquid at said third elevated temperature and for closing said normally open control switch means to energize said solenoid valve and close said vent means during a second portion of said cooking cycle, and for re-opening said normally open control switch means to de-energize said solenoid valve and open said vent means after said second portion of said cooking cycle.

* * * * *